United States Patent [19]

Hunt

[11] E Re. 29,418

[45] Reissued Sept. 27, 1977

[54] FLEXIBLE CERAMIC MEMBER HAVING A PRE-LOADED TENSILE FORCE APPLYING MEANS

[75] Inventor: Robert F. Hunt, Concord, Tenn.

[73] Assignee: International Paper Company, New York, N.Y.

[21] Appl. No.: 741,049

[22] Filed: Nov. 11, 1976

Related U.S. Patent Documents

Reissue of:

[64] Patent No.: 3,869,344
Issued: Mar. 4, 1975
Appl. No.: 377,894
Filed: July 10, 1973

U.S. Applications:

[63] Continuation-in-part of Ser. No. 273,308, July 19, 1972, abandoned.

[51] Int. Cl.[2] ..... D21F 1/48; D21G 3/00

[52] U.S. Cl. ..... 162/274; 15/256.51; 162/281; 162/352; 162/374

[58] Field of Search ..... 162/211, 274, 281, 351, 162/352, 363, 373, 374; 15/256.51; 29/452; 138/155; 174/141 R, 141 C, 150; 52/227

[56] References Cited

U.S. PATENT DOCUMENTS

| | | | |
|---|---|---|---|
| 550,281 | 11/1895 | Martin | 138/155 |
| 1,826,735 | 10/1931 | Cofrin | 162/352 |
| 2,408,176 | 9/1946 | Proulx | 162/352 |
| 3,393,123 | 7/1968 | Klingler et al. | 162/274 |
| 3,732,142 | 5/1973 | Beacom et al. | 162/374 |

OTHER PUBLICATIONS

Modern Ceramics, Edited by J. E. Howe and W. C. Riley; John Wiley & Sons, Inc., 1965; pp. 209-214.

*Primary Examiner*—S. Leon Bashore
*Assistant Examiner*—Richard V. Fisher
*Attorney, Agent, or Firm*—Fitch, Even, Tabin & Luedeka

[57] ABSTRACT

An elongated flexible member including a plurality of ceramic segments, each segment having at least two opposite surfaces that are flat and parallel. The segments are aligned in stacked relationship with their flat faces in abutting face-to-face relation and forced toward each other in the direction of their composite length with a force which is sufficient to maintain the segments in compression when subjected to conditions of thermal change and/or flexing of the member during use. A method for making the ceramic member is disclosed.

7 Claims, 6 Drawing Figures

FLEXIBLE CERAMIC MEMBER HAVING A PRE-LOADED TENSILE FORCE APPLYING MEANS

Matter enclosed in heavy brackets [ ] appears in the original patent but forms no part of this reissue specification; matter printed in italics indicates the additions made by reissue.

This application is a continuation-in-part of Ser. No. 273,308, filed July 19, 1972 now abandoned.

This invention relates to elongated flexible ceramic elements, and more particularly to an element of this type which is useful in applications where the element is to be subjected to conditions of thermal change and/or forces tending to bend the element along its length.

The physical properties and/or the chemical inertness of ceramic materials frequently suggest such materials for use in applications wherein the material is to be fabricated into elongated articles such as a ceramic conduit for conveying corrosive chemicals. Not infrequently, such elongated elements are subjected to thermal change or forces, such as vibration or frictional drag, which tend to bend or deflect the element along its longitudinal axis.

Because of the relatively high cost and difficulty of manufacturing ceramic elements in continuous lengths, for example lengths greater than about two feet, ceramic materials have heretofore been generally limited to use in those situations where their relatively high cost is justified in order to obtain the advantages from the physical and/or chemical properties of the ceramic materials. Even in such special situations where ceramic lengths have been employed, it has been important to assure that the elongated elements neither bend nor are subjected to localized stresses, so as to avoid cracking and/or breaking of the elongated element. Consequently, the circumstances under which elongated ceramic elements could be used heretofore have been severely limited.

This invention also relates to systems in which there are at least two members, one of which is movable relative to the other and in frictional engagement therewith. More particularly, the invention relates to such a system in which at least one of the members is an elongated flexible ceramic member having a working or wear surface defining an area of contact between the members and which has improved physical characteristics.

Examples of such systems include the combination of elongated foils in contact with a forming fabric in a Fourdrinier [of] *or* other papermaking machine, a Uhle box which bears against a forming fabric or felt in a papermaking machine, and doctor blades for use in contact with rotating drums or other moving members.

It is therefore an object of the present invention to provide an elongated flexible ceramic element. It is also an object of this invention to provide an elongated flexible ceramic element of substantial length wherein the element comprises a plurality of ceramic segments adapted to accommodate conditions of thermal change or bending of the element within predetermined limits. Another object of this invention is to provide a method for the manufacture of an elongated flexible ceramic element.

It is also an object of this invention to provide a system comprising at least two members one of which is movable with respect to the other and in frictional engagement therewith and one of which is an elongated flexible ceramic member.

Other objects and advantages of the invention will be recognized from the following description, including the drawings in which.

Figure 6:
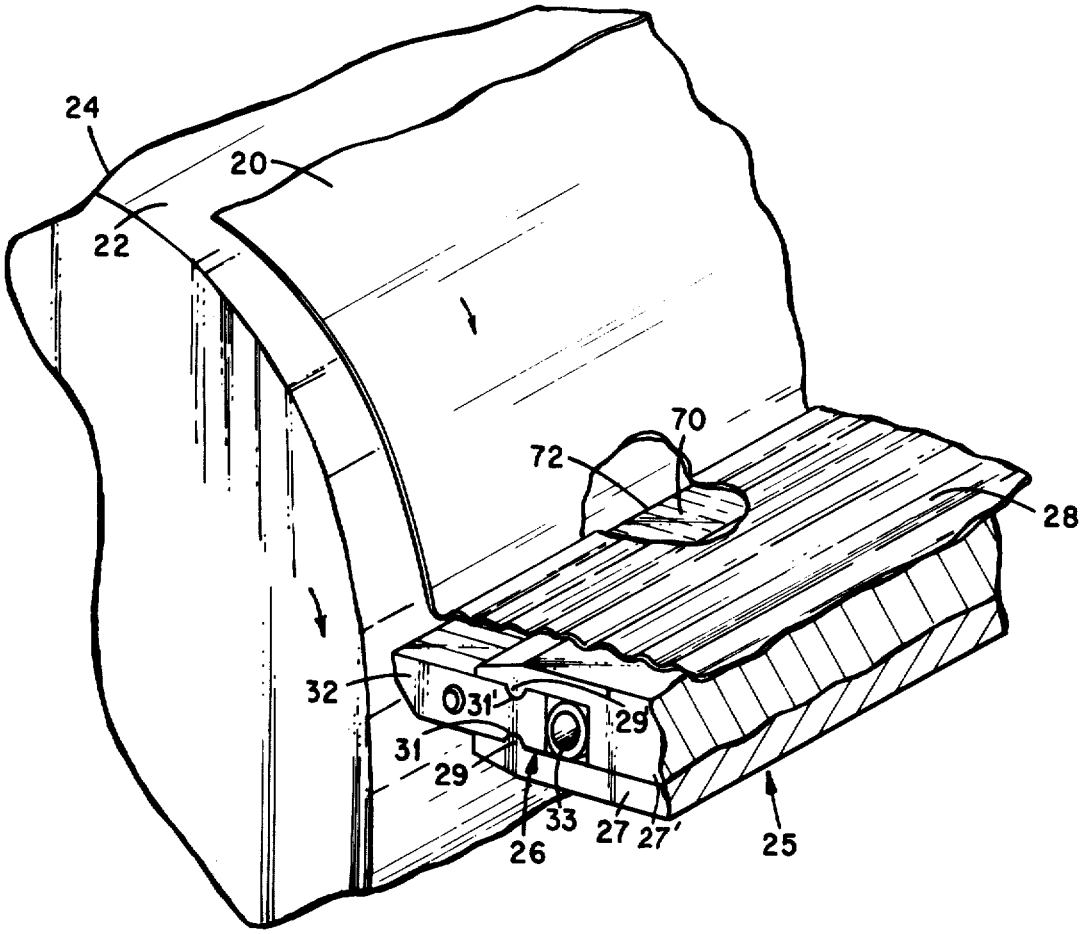

One embodiment of a system which includes an elongated flexible ceramic member and which includes at least two members, one of which is movable relative to the other and in frictional engagement therewith is the doctor system depicted in FIG. 6. This depicted system is a Yankee Dryer 24 on which a paper web 20 is dried and creped. The web is trained about a portion of the peripheral surface of the dryer 24 and dried by heat transferred through the cylindrical shell 22 thereof. Steam introduced into the interior of the dryer shell is commonly used to heat the shell. The paper web 20 is doctored from the shell 22 by means of a doctor blade 26 as is well known in the art to provide a creped paper web 28. In this embodiment, the dryer shell 22 comprises a first member of the system and is movable relative to and in frictional engagement with the doctor blade 26 which comprises a second member of the system.

In the system depicted in FIG. 6, the doctor blade 26 is positioned with respect to the dryer surface 22 and to the paper web 20 by support means shown generally at 25 including a pair of jaws 27 and 27′ having shoulders 29 and 29′, respectively, that engage mating slots 31 and 31′ in opposite surfaces of the doctor blade 26. Other suitable mounting means will be readily recognized by one skilled in the art.

In operation of the depicted system, the surface of the shell 22 becomes irregular due to its being heated by the steam. In order to keep the doctor blade in contact with the shell for doctoring the web from the shell, it is necessary to bend the doctor blade so that it conforms to the irregularities in the shell surface.

In this and other systems of this type, it is desired that one of the members be flexible and have a good wear surface that is engaged by the other of the members. If has long been desired that such one of the members be made of a ceramic material to take advantage of the wear resistance of this material. Continuous lengths of ceramic are prohibitively costly. Members having small ceramic inerts disposed along the length of the member to define a wear surface have been tried but such members develop gaps between the inserts where the member bends during use so that the edges and/or corners of the separated segments become points of excessive wear.

Figure 2:
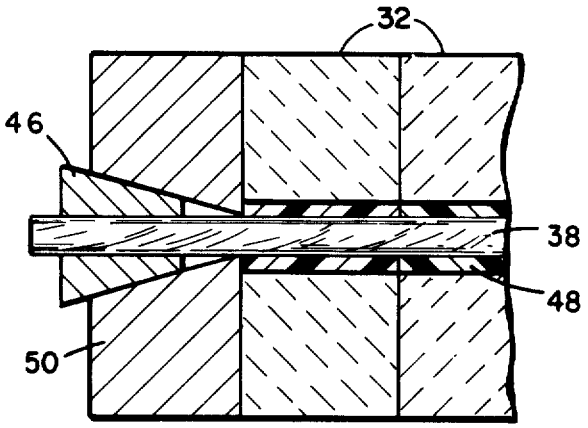
FIG. 2 is a sectional and fragmentary view of one end of the member shown in FIG. 1.
Figure 3:
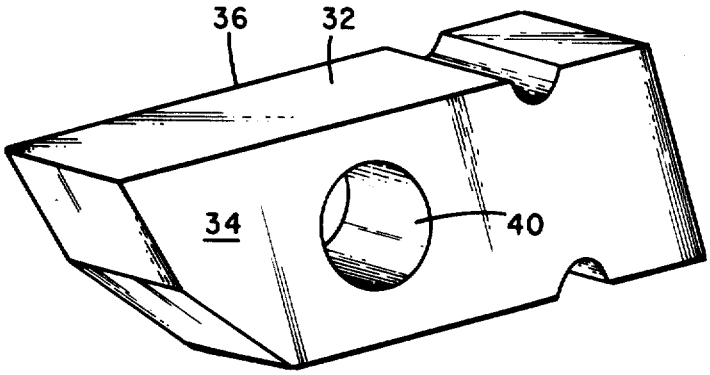
FIG. 3 is a representation of a segment of the member shown in FIG. 1.

One of the members of the illustrated doctor blade embodiment comprises an elongated flexible member 30 including a plurality of ceramic segments 32 each having at least two opposite substantially parallel flat faces 34 and 36 (FIG. 3). (The member 30 comprises the doctor blade 26 in FIG. 6). As illustrated, the ceramic segments are aligned in abutting face-to-face relation to define the composite 30, the faces 34 and 36 being disposed substantially perpendicular to the longitudinal axis, i.e. the composite length, of the member 30. The aligned segments 32 are forced toward each other by a tension means 38 (FIG. 2) with a force which will elastically compress the segments to the extent that when the member is deflected during use the compression in those portions of the abutting segment faces disposed along the outside of the line of curvature of the deflected member is relieved to a degree less than that which will result in physical separation of such face positions and the compression in those portions of the abutting segment faces disposed along the inside of the line of curvature of the deflected member will increase to the degree necessary to accommodate the deflection without physical destruction of such portions of the segments.

Each of the segments 32 of the elongated member 30 of the present disclosure is fabricated from a hard dense ceramic material that is available at a reasonable cost.

The ceramic preferably is an impervious crystalline material that combines high mechanical strength with extreme hardness, inertness, refractoriness, and high chemical resistance properties. Because these properties are retained over a wide range of application and environmental conditions that many other materials cannot withstand, such ceramics suitably serve under conditions adverse to other materials. Alumina, silicon carbide, boron carbide and silicon nitride materials possess those properties required in many industrial applications, and are economically feasible for such end uses. Alumina is particularly suitable and is preferred for use in the present ceramic member because of its properties and its availability at relatively low cost when formed in relatively short segments.

The alumina segment 32 is formed by compacting finely ground oxide powders with fluxing agents and inhibitors at relatively high pressures as is known in the art. Forming methods include dry pressing, isostatic pressing, casting, extrusion, and injection molding. After forming, the resulting "green" ceramic segment is fired at a high temperature for a specific length of time. Firing temperatures vary but usually range between 2,500° F. and 3,250° F. During firing the ceramic shrinks; therefore, segments are formed while in the green state to allow for the physical reduction caused by firing. After firing, the ceramic segment is strong, hard and dense, composed substantially of pure alumina of controlled crystal size. Machining of the ceramic segments is possible either before or after firing. Fired segments are ground or lapped to obtain the desired surfaces thereof. Grinding usually must be done with diamond-impregnated wheels, although silicon-carbide or alumina wheels are sometimes used.

Most of those physical properties desired in the ceramic segments improve as the purity of the ceramic increases, especially hardness, compressive strength, wear resistance and chemical resistance. For example, alumina ceramic compositions having aluminum oxide contents less than about 85% lose certain of their properties to an unacceptable degree. Preferably, the alumina ceramics contain about 90.0% or more aluminum oxide.

The compressive strength of the ceramics exceed that for most materials. For example, compressive strengths as high as 550,000 psi have been obtained in certain relatively pure alumina ceramics. Suitable compressive strengths for the ceramic segments 32 range upwardly from about 200,000 psi.

Each of the segments 32 is provided with two opposite substantially flat and parallel faces 34 and 36. The segments are disposed in face-to-face relation with their parallel faces abutting the parallel faces of adjacent segments to define the elongated composite 30 of a desired length and subjected to a compressive force applied at substantially right angles to the faces. The flatness and parallelism of the abutting segment faces help to prevent cracking or breaking of the segments due to unevenly applied stresses or localized stresses by distributing the compressive forces evenly over the abutting faces. Abutting segment faces, each of which is flat to within about 0.0002 inches and has a surface finish of less than about 20 microinches arithmetic average (AA) have been found to be suitable for these purposes. When such individual segments are placed in face-to-face relation without grout or adhesive, the abutting flat faces of adjacent segments lie in intimate contact with each other over substantially the entire areas of the abutting faces without significant open space therebetween so that the abutting faces supply support to each other especially when the surface of the member is being ground as will be described hereinafter. In one embodiment, each segment is provided with an opening 40 extending between the opposite flat faces 34 and 36 thereof. This opening in a segment is aligned with similar openings of abutting segments to provide a channel through the composite 30 for receiving a tension means 38 for compressing the segments in the direction of their composite length.

As noted above, in producing an elongated member of given length, a sufficient number of segments 32 are assembled in face-to-face relation with their respective openings 40 aligned to obtain the desired length. The assembled segments are secured together with a force applied substantially in the direction of the length of the composite 30 and substantially perpendicular to the flat parallel faces of the segments. This force is sufficient to place the segments in elastic compression and is suitably applied as by a tension means 38 applying a compressive force to opposite ends 42 and 44 of the composite 30. One suitable tension means is a cable 38 inserted through the aligned openings 40 extending between the opposite faces 34 and 36 of each of the assembled segments, pulled to the required length, anchored at the opposite ends of the composite as by swage fittings 46 to exert a compressive force upon the composite at its opposite ends. Alternatively, other tensioning means may be used to establish the desired compression of the segments in the composite. One such other means includes a rod disposed in the aligned openings 24 of the segments and fitted with a nut at one or both of its ends so that tightening of the nuts tensions the rod and places the segments in compression. One suitable cable for applying the desired compression force to the segments is made of carbon steel and of the general type employed in prestressed concrete structures.

The cable 38 may be chosen with a cross sectional area less than the cross sectional area of the opening 40 in each segment and after the segment is in place on the cable the space between the cable and the inside surface of the opening in the segment may be filled with a grout 48 (FIGS. 1 and 2), such as rigid polyurethane, to position the cable within the openings. One suitable grout is a liquid casting urethane polymer designated as LD-2699, sold by E. I. Du Pont de Nemours Company, Trenton, N. J. This grout also accommodates the axial movement of the segments with respect to the compression cable during compression of the composite and/or relative movement between the segments and the cable in the event the member is subjected to thermal change during use.

As illustrated, the composite of segments is provided with a plate or other means such as a metallic segment 50 at each end of the composite to provide for distribution of the compressive force over the face of each end segment to protect it from damage by localized forces. In those instances where the desired compression is relatively great a plurality of tension means, e.g. cables, provides greater compressive capability. In that event, the plurality of cables 38 are desirably threaded through spaced apart, aligned openings through the segments. Such construction aids in more evenly distributing the compressive forces over the abutting faces of the segments.

Figure 5:
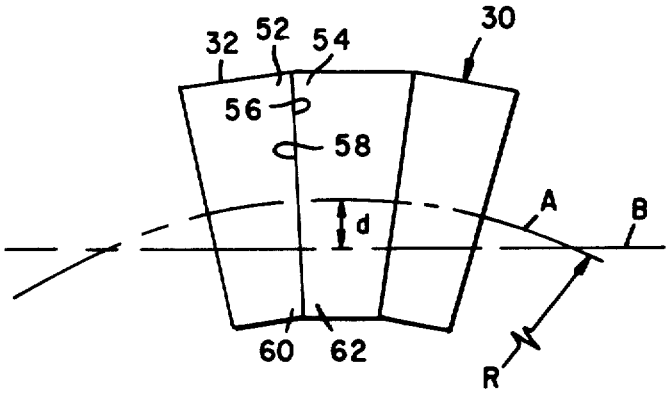
FIG. 5 is a grossly exaggerated representation of a portion of a deflected composite of ceramic segments; and, FIG. 6 is a representation of one embodiment of a system including at least two relatively movable members and showing various features of the invention.

The flexibility of the member 30 is made possible by employing relatively short segments (e.g. on the order of one inch long) held together with a compressive force such that when the elongated composite 30 deflects by a distance d, along its length (see FIG. 5), at least a part of the compression in those portions 52 and 54 of the abutting faces 56 and 58 of adjacent segments 32 disposed on the outside of the line of curvature A of the deflected composite 30 is relieved, permitting those portions of the segments to expand to accommodate the deflection without physically separating. Importantly, the compressive force holding the segments together is less than the maximum compressive strength of the ceramic material by an amount which permits those portions 60 and 62 of the abutting faces 56 and 58 of adjacent segments on the inside of the line of curvature A of the deflected composite to be compressed by an additional amount, causing these portions of the segments to compress by an amount sufficient to accommodate the deflection without destruction of the segments. In addition, the length of the individual segments is chosen to be sufficiently small as permits their manufacture at minimized costs taking into consideration the anticipated compressive forces to which the segments are to be subjected in order to obtain the desired response of the composite incident to deflective forces.

In addition to the deflective forces, consideration must be given to thermal changes affecting the element in that such will usually produce different responses in the ceramic segments and the tension member. Such thermal changes can arise by differences in the start-up and operating temperatures of the machine or system in which the element is installed, and/or changes in ambient temperature of the element during assembly, shipping or installation.

Figure 4:
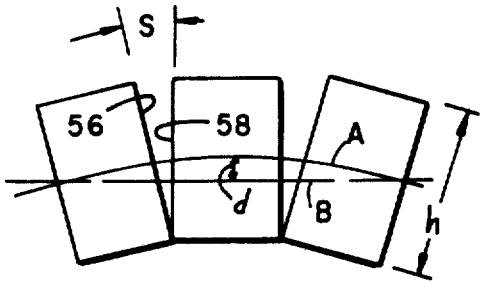
FIG. 4 is a grossly exaggerated representation of a plurality of segments deflected in a manner to aid in explaining certain calculations attending the disclosed invention.

In calculating the compression required to accommodate the maximum anticipated deflection of a member of given length without separation of the segments, it is assumed that the deflection of the member will take the shape of a uniformly loaded simple beam and that the maximum deflection will be sufficiently small (less than about 1% of the member length) to permit the use of calculations based on circular arcs, rather than more exact curves. The latter could be used in those circumstances where more exact calculations are required; however, it has been found that such is not necessary in constructing flexible members for most end uses. More specifically, and with reference to FIGS. 4 and 5, for a member 30 of given length, l (in inches), having a longitudinal axis, subjected to a maximum anticipated deflection, d (in inches), along a line of curvature A, and made up of a plurality of segments 32 each being of a known [length, L (in inches), and a] dimension, h (in inches), across the segments, in the direction of the applied deflective force and a cross-sectional area, $A_c$, in square inches, the preloading on the tension member, e.g. cable 38, which will impart to the ceramic segments the necessary compressive force that precludes separation of the segments is calcuated using the equation $$P_D = \frac{(EcAc)\dfrac{8dh}{l^2 + 4d^2}\,[(L)]}{2} \qquad \text{Eq.(1)}$$

where:

$E_c$ = the modulus of elasticity of the ceramic;

$A_c$ = the cross-sectional area of a ceramic segment in a plane perpendicular to the composite length of the member, in square inches;

d = the maximum anticipated deflection of the member, in inches;

h = the dimension of a ceramic segment in the plane perpendicular to the composite length of the member and in alignment with the direction of the deflective force, in inches;

l = the overall length of the member. [, and

L = the length of a ceramic segment, in inches]

With reference to Equation (1), it is noted that the initially determined preloading is divided by 2 to give the preloading to be used in tensioning the cable 38. This fact arises because of the manner in which the ceramic segments are stressed when the member is deflected while under compression. More specifically, assuming the cable 38 is disposed midway between the ends of the segment dimension h, when the member is in an undeflected state, the stress on each compressed ceramic segment is the same at any point along the dimension h. When the member is deflected, the stress in that portion of a segment on the outside of the line of curvature (on the outside end of the dimension h) is reduced to zero and the stress in that portion of the same segment on the inside of the line of curvature is doubled. Thus when preloading the aligned segments, the stress imparted to the segments is taken as the average of the stresses along the dimension h when the member is deflected by a maximum amount.

The effect of thermal change upon the member 30 must also be taken into account. Thermal changes occur most frequently by reason of the member 30 being manufactured at a first temperature, room temperature for example, and thereafter encountering a substantially higher operating temperature. In such circumstances, the strain in the cable 38 decreases when its temperature increases by reason of the cable expanding when heated. Expansion of the cable cross-section as well as along its length is of importance. The ceramic also expands when heated, but usually to a lesser extent than the cable, so that there is added to the preload calculated for deflection in accordance with Equation (1), an additional preloading which will compensate for the effect of thermal change upon the cable and the ceramic and provide the desired preloading for accommodating deflection up to a maximum temperature. Such additional preloading of the tension means is calculated using the equation $$P_T = \frac{(\alpha_s - \alpha_c)\,\Delta T}{\frac{1}{A_sE_s} + \frac{1}{A_cE_c}} \qquad \text{Eq.(2)}$$

where:

$\alpha_3$ = the coefficient of thermal expansion of the tension member;

$\alpha_c$ = the coefficient of thermal expansion of the ceramic;

$\Delta T$ = degrees of temperature change anticipated, in degrees F;

$A_s$ = cross-sectional area of the tension member, in square inches;

$E_s$ = the modulus of elasticity of the tension member;

$A_c$ = the cross-sectional area of a ceramic segment in a plane perpendicular to the length of the member, in square inches;

$E_c$ = the modulus of elasticity of the ceramic.

Combining Equations (1) and (2) gives $$P = \frac{E_cA_c\frac{8dh}{l^2 + 4d^2}[L]}{2} + \frac{(\alpha_s - \alpha_c)\,\Delta T}{\frac{1}{A_sE_2} + \frac{1}{A_cE_c}} \qquad \text{Eq.(3)}$$

where P is the total preloading of the tension member which will prevent separation of the segments of the member 30 when the member is deflected up to a maximum amount d while at a temperature less than an anticipated maximum temperature. It will be noted that in those situations where the member 30 will not experience a thermal change, $\Delta T$ will be zero and $P_T$[including its equivalent expression in Equation (3)] will be zero and no additional preloading will be required to account for thermal changes.

Thus, in any given situation where the elongated member 30 is to be subjected to deflection forces, it is possible to select a composite which exhibits the desired non-separation of abutting segment faces when the composite is deflected along its composite length. As shown in Equation (1), the preloading force (compressive force) applied to the aligned segments, for any given maximum anticipated deflection and total length of the segmented member, depends upon the length of each individual segment and the dimension h of each segment. Thus, if the deflection capability of a given composite of ceramic segments is less than that which precludes physical separation of the abutting faces of the segments under the anticipated deflection, an adjustment can be made, in many instances, in either the length or width of the individual segments, or in both the length and width. Of course, consideration must be give to the added compression experienced by those portions of the abutting segment faces disposed on the inside of the line of curvature of the deflected composite.

The preloading force exerted upon the ceramic segments is kept below that amount of force which will compress the ceramic material to within about one-half, and preferably to within about 20%, of its maximum compressive strength to insure that localized stresses which may occur within the composite do not exceed such maximum compressive strength with resultant damage to one or more segments. This preferred preloading also provides a substantial margin of safety against damage to the segments by inadvertent overloading of the segments to produce undue deflection. In any event, the preloading of the segments is sufficient to shorten the length of each segment, hence shorten the overall length of the composite. Further, in the preferred preloading, the segments are sufficiently deformed at the interface between abutting segment faces as results in substantial loss of joint identity at such interface. Such deformation is known to occur when the segments are preloaded to between about 15% and 20% of the maximum compressive strength of the ceramic. This substantial loss of joint identity has been found to be important in establishing the working surface on the member in that such allows the composite to be ground to a suitable smoothness. Less preloading is acceptable but at a loss of certainty of achieving the desired properties in the composite. Thus, the preloading of the ceramic segments must be sufficient to maintain the segments abutting when the member is deflected by a maximum amount d but less than that preloading which will compress the ceramic to more than one-half its total compressive strength.

It is understood that in the present discussion each of the segments is substantially identical to each other segment in a given composite. Such is assumed for purposes of simplifying the disclosure. It is not required, however, that all the segments be identical. For example, it may be desirable to provide a segment member which is deflected by different degrees along its length. In such an embodiment, the deflective characteristics of the member will differ in different portions of its length and the segments in each such portion may differ in length from the segments in other portions of the length of the member.

As disclosed, one of the members of the system is movable with respect to the other member. In many embodiments, one member is held stationary while the other member moves thereover in frictional engagement therewith. Similarly, in many embodiments the stationary member wll be the flexible ceramic member 30 described above and will include a leading edge 72 which is initially contacted by the other member as it moves over the ceramic member. In such instances it is important that such leading edge be straight and free of irregularities such as gaps resulting from chipping of the leading edge inasmuch as such irregularities, among other things, hinder or prevent alignment between the two members and create wear points between the moving members.

The segmented member 30, being intended for use in a system where it is in frictional engagement with a further member and there is relative movement between the members, is provided with an elongated smooth working surface 70. This surface 70 extends along the length of the member 30 and defines an extended area of contact between the relatively moving members. Minimum wear of this surface and of the other of the moving members is obtained by maximizing the smoothness of this working surface. This is accomplished by grinding the surface 70 after the segments have been formed into the composite 30 and preloaded as described hereinabove.

In a typical grinding operation the segmented member 30 is anchored on the bed of a grinding machine. A diamond impregnated grinding wheel, preferably of the type having an annular planar grinding surface is used in the grinding process. This grinding wheel is moved into contact with the segmented member with the plane of the grinding surface of the grinding wheel disposed at a slight angle with respect to the plane of the surface to be ground so that only a portion of the rotating grinding surface is in contact with the segments at any given time. Preferably the grinding surface plane is also disposed with respect to the working surface so that grinding of the surface takes place as the annular grinding surface moves onto the surface and little or no grinding takes place as the grinding surface is moving away from the surface being ground.

Figure 1:
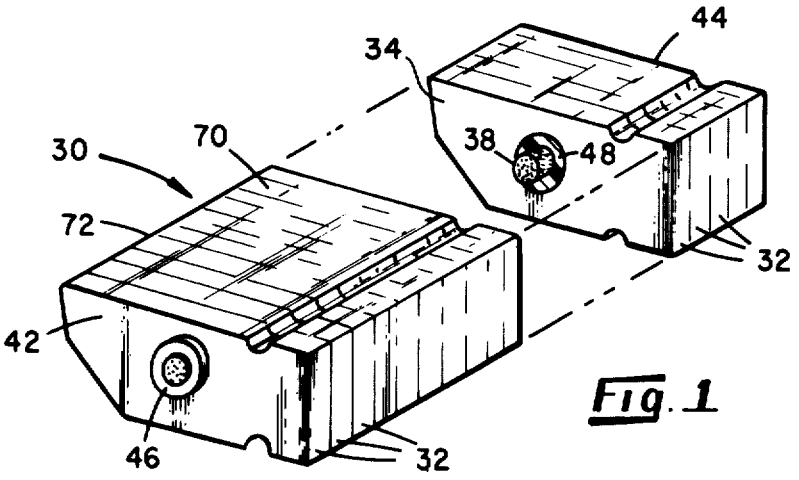
FIG. 1 is a representation of an elongated segmented ceramic member embodying various features of the invention.

The rotation of the grinding wheel, when grinding a leading edge of the type shown in FIG. 1, is such that the grinding surface initially contacts the leading edge 72 as the grinding surface moves toward that edge. In this manner, the grinding forces exerted upon the segments are directed inwardly of the segments to aid in preventing chipping of the segments edges during grinding. Preferably, the grinding action at the leading edge is in a direction substantially perpendicular to the leading edge. Variations of greater than about 10 degrees from such perpendicular relationship provide relatively poor edges.

In the grinding operation the compression of the segments in the direction of their composite length maintains the edges of abutting segments in supporting relationship to each other. In addition to this physical support of one segment by its neighbor, the compression in the segments is sufficient to prevent the force of the grinding operation from placing the segment edges in tension as the grinding wheel drags across the segment, thereby enhancing the resistance of the segments to edge chipping during grinding. This results in an improved smoothness of the working surface 70 and is believed to be responsible in part for the good surface finishes obtained by applicant when grinding the segmented member as disclosed herein.

The grinding operation disclosed herein provides surface finishes of the working surface of less than about 20 microinches (AA). This degree of surface smoothness has been found to impart exceptionally good wear characteristics to both moving members of the system. Moreover, edges developed by such grinding procedures are substantially straight lines and substantially free of chipped out portions. Such leading edge also has a smoothness substantially equivalent to the smoothness of the remainder of the working surface 70.

EXAMPLE I

A doctor blade for doctoring a paper web from the surface of a cylindrical dryer shell is made as follows. Such doctor blades normally are deflected by different amounts along different portions of their length due to undulations in the dryer shell across its width. The most severe deflection is chosen and the total deflection capability of the blade is made sufficient to accommodate it. In this Example the length, l, of the chosen deflected portion is 50 inches.

The doctor blade in the configuration illustrated in FIG. 1 is made from one inch long (L) alumina segments (AD-995 from Coors Porcelain Co.) each having a cross-sectional area ($A_c$) of 0.78 square inches. The dimension [(H)] *(h)*, the dimension in the direction of the application of the deflective forces, is 0.875 inch. These segments are aligned with their flat parallel faces abutting and compressed in the direction of their composite length by a stainless steel cable of 0.14 square inches cross-sectional area threaded through aligned openings in the segments.

The maximum anticipated deflection of the doctor blade over the chosen 50 inch length, l, is determined to be 0.027 inch and the anticipated thermal change is from 70° F. to 300° F. ($\Delta T = 230°$ F). The preloading for the cable which passes through the segments is calculated using Equation (3) as follows:

$$P = \frac{E_c A_c \frac{8dh}{l^2 + 4d^2} [L]}{2} + \frac{(\alpha_s - \alpha_c)\,\Delta T}{\frac{1}{A_s E_s} + \frac{1}{A_c E_c}}$$

$$P = \frac{(54 \times 10^6)\,(0.78)\,\frac{8(0.027)\,(0.875)}{(50)^2 + 4(0.027)^2} [(1)]}{2} + \frac{[(6.3 \times 10^{-6}) - (3.5 \times 10^{-6})]\,230}{\frac{1}{(0.16)\,(29 \times 10^6)} + \frac{1}{(0.78)\,(54 \times 10^6)}}$$

$P = 1579.5 + 2385.19$ $P = 3964.69$ pounds

This preloading imparted a compressive force to the ceramic which is about 1.54% of the 330,000 psi approximate maximum compressive strength for AD-995 alumina. This degree of compression provides for the anticipated deflection, occurring at a temperature of 300° F., without complete relief of the compression in those portions of the abutting segment faces furtherest from the longitudinal axis of the member along which the deflection occurs and, importantly, provides for additional compression of those portions of the abutting segment faces nearest the longitudinal axis of the member as necessary to accommodate the deflection.

The working surface 70 of the segmented member 30 is ground while the member is supported along its entire length on the bed of a grinding machine. A five hundred grit diamond impregnated wheel, having an annular grinding surface, as sold by the Norton Company is employed in the grinding operation. The grinding wheel has a diameter of 10 inches, and is rotated at approximately 3600 revolutions per minute. The wheel is moved along the length of the working surface at a speed between about 10 and 20 feet per minute. The position of the grinding wheel relative to the working surface and its rotational movement is as described above. The grinding operation provides a surface finish of about 20 microinches (AA) with no significant chipping of the leading edge 72.

EXAMPLE II

Another system of the type disclosed herein comprises a foil and a forming fabric of a Fourdrinier papermaking machine. In this system, the elongated foil is disposed beneath the forming fabric and serves to support the fabric and remove water from a slurry of papermaking fibers carried on the fabric. In these functions, the fabric slides over the foil while it is pulled against the foil by suction developed by the foil. There is substantial wear of both the foil and the wire in these systems as known heretofore.

A 200 inch long foil for use in a Fourdrinier papermaking machine is made from 200 one inch long AD-995 alumina segments held in compression by a 0.677 inch diameter stainless steel cable which is passed through an opening located centrally of each segment. Each segment has a cross-sectional area ($A_c$) of 2 square inches, and a dimension (h) of 2 inches. The maximum anticipated deflection of the foil is 0.5 inch and the anticipated thermal change is from 70° F. to 170° F. ($\Delta T = 100°$ F).

Using Equation (3), the preloading for the cable for preventing separation of the segments under such conditions is calculated as follows:

$$P = \frac{(54 \times 10^6)(2)\dfrac{(8)(0.5)(2)}{200^2 + (4)(0.5)^2}[(1)]}{2} + \frac{[(6.3 \times 10^{-6}) - (3.5 \times 10^{-6})](100)}{\dfrac{1}{(0.36)(29 \times 10^6)} + \dfrac{1}{(2)(54 \times 10^6)}}$$

P = 10,746 + 3,557.8
P = 14,304 pounds

The preload force in this example stresses the ceramic to 2.17% of its maximum compressive strength.

This foil is provided with a ground elongated working surface having a smoothness of less than about 20 microinches AA in the manner disclosed herein. In use, the foil exhibits excellent wear qualities and does not exhibit gaps between abutting segment faces. Foils of this type when used in a high speed Fourdrinier papermaking machine do not produce streaks in the paper web formed on the forming fabric moving over the foil, as has been experienced by the prior art segmented foils which develop gaps between abutting segments.

EXAMPLE III

A further system of the type disclosed herein comprises a suction device for use in a papermaking machine known as a Uhle Box. This suction device comprises an elongated trough-like device having an elongated slot extending along its length and opening toward a forming fabric or felt moving thereacross. A suction is developed within the Uhle Box so that the fabric or felt is pulled against the edges of the slot and water or other material is pulled from the fabric or felt into the Uhle Box. The edges of the slot are subjected to relatively great wear forces and the Uhle Box, hence the slot edges, are subjected to substantial deflective forces as the fabric or felt moves across the device in a direction transverse to its length.

A Uhle Box having each of its slot edges made of a flexible ceramic member may be fabricated using the teachings of the invention as follows. Each such slot edge is 200 inches long and made of 1 inch long AD-995 alumina segments held in compression by a stainless steel cable having a cross sectional area of 0.25 square inches which is disposed in aligned openings in the segments. Each segment has a cross-sectional area ($A_c$) of 0.92 square inch and a dimension (h) of 1.250 inches.

In calculating the preload for the cable, the maximum anticipated deflection is 3 inches and the maximum temperature anticipated during use is 170° F. The temperature at assembly is 70° F, giving a $\Delta T$ of 100° F.

Using Equation (3) the preload is determined as follows:

$$P = \frac{(54 \times 10^6)(0.92)\dfrac{(8)(3)(1.250)}{(200)^2 + (4)(3)^2}[(1)]}{2} + \frac{[(6.3 \times 10^6) - (3.5 \times 10^6)]\,100}{\dfrac{1}{(0.25)(29 \times 10^6)} + \dfrac{1}{(0.92)(54 \times 10^6)}}$$

P = 18,605 + 1,771.5
P = 20,376.5 pounds

The preload force in this Example stresses the ceramic ot 6.71% of its maximum compressive strength.

That portion of the ceramic member which engages the moving fabric or felt is ground to a surface smoothness of less than 20 microinches AA by the procedures set forth above. As in Examples I and II, the ceramic member exhibits good wear charcteristics and does not develop gaps between the segment faces when deflected by the anticipated maximum amount.

While preferred embodiments have been shown and described, it will be understood that there is no intent to limit the invention by such disclosure but rather, it is intended to cover all modifications and alternative constructions falling within the spirit and scope of the invention as defined in the appended claims.

What is claimed is:

1. In a system including at least two members one of which is movable relative to the other and in frictional engagement therewith, such as members in a papermaking system, the improvement wherein the other member is an elongated flexible ceramic element comprising a plurality of ceramic segments, each having at least two opposite surfaces that are substantially flat and parallel, said segments being aligned with their flat faces in abutting face-to-face relation and in respective planes that are oriented substantially perpendicular to the composite length of said plurality of segments, tension means anchored to opposite ends of said element and forcing said segments toward each other in a direction along their composite length and substantially perpendicular to their respective parallel faces with a preload force on said tension means, when said latter member is in an undeflected condition, that is at least the force calculated by the equation:

$$P = \frac{E_c A_c \dfrac{8dh}{l^2 + 4d^2}[(L)]}{2} + \frac{(\alpha_s - \alpha_c)\Delta T}{\dfrac{1}{A_s E_s} \quad \dfrac{1}{A_c E_c}}$$

where:

P is the preload of said tension means, in pounds;

$E_c$ is the modulus of elasticity of the ceramic material;

$A_c$ is the cross-sectional area of a ceramic segment in a plane perpendicular to the composite length of said elongated ceramic element in square inches;

d is the maximum anticipated deflection of said elongated ceramic element, in inches;

h is the dimension of a ceramic segment in the plane perpendicular to the composite length of said elongated ceramic element and in alignment with the direction of said deflective force, in inches;

l is the overall length of said latter member;

$\alpha_t$ is the coefficient of thermal expansion of said tension means;

$\alpha_c$ is the coefficient of thermal expansion of said ceramic;

$\Delta_T$ is the degree of temperature change anticipated, in degrees F.;

$A_t$ is the cross-sectional area of said tension means, $E_t$ is the modulus of elasticity of said tension means, [and L is the length of a ceramic segment, in inches,] but less than the amount of preload force which will compress said ceramic to over about one-half of its maximum compressive strength, whereby loading forces exerted upon said elongated ceramic element are directed thereagainst in a direction substantially perpendicular to the longitudinal dimension thereof and deflection of said elongated ceramic element pursuant to such loading forces is compensated for in said compressed segments by further compression of said segments in those portions of the abutting faces thereof disposed along the inside of the line of curvature of said elongated ceramic element and by relief of less than all of the compression in those portions of said abutting faces that are disposed along the outside of said line of curvature of said elongated ceramic element without physical separation of said segments at their abutting faces.

2. An elongated ceramic element in accordance with claim 1 wherein said preload force does not exceed that preload force which will compress said segments to greater than about 20% of their maximum compressive strength.

3. An elongated ceramic element in accordance with claim 1 wherein said tension means forcing said segments toward each other is a nonceramic material.

4. An elongated ceramic element in accordance with claim 1 wherein said ceramic comprises alumina.

5. An elongated ceramic element in accordance with claim 4 wherein said alumina has a purity of greater than about 85%.

6. An elongated ceramic element in accordance with claim 1 wherein said ceramic segments are substantially identical to one another and each has an opening extending between its opposite flat and parallel surfaces, said openings in said segments being in register and said tension means extending therethrough.

7. An elongated ceramic element in accordance with claim 1 wherein each of the abutting flat faces of said ceramic segments is flat to within about 0.0002 inches.

* * * * *